(12) United States Patent
Bryant et al.

(10) Patent No.: US 12,233,825 B2
(45) Date of Patent: Feb. 25, 2025

(54) METHOD FOR HAZARD DETECTION AND FIRE PREVENTION IN A MOBILE REFUELING SYSTEM

(71) Applicant: Fire & Risk Alliance, LLC, Rockville, MD (US)

(72) Inventors: Scott Michael Bryant, Berlin, MD (US); Brent Allen Turner, III, Ijamsville, MD (US); Anthony James Natale, Brick, NJ (US); Noah Lael Ryder, Silver Spring, MD (US); Ryan Alexander Hutchens, Derwood, MD (US)

(73) Assignee: Fire & Risk Alliance, LLC, Rockville, MD (US)

( * ) Notice: Subject to any disclaimer, the term of this patent is extended or adjusted under 35 U.S.C. 154(b) by 0 days.

(21) Appl. No.: 18/226,142

(22) Filed: Jul. 25, 2023

(65) Prior Publication Data
US 2024/0025378 A1    Jan. 25, 2024

Related U.S. Application Data

(60) Provisional application No. 63/392,082, filed on Jul. 25, 2022.

(51) Int. Cl.
*B60S 5/02* (2006.01)
*G06Q 50/26* (2024.01)
*G08B 19/00* (2006.01)

(52) U.S. Cl.
CPC .............. *B60S 5/02* (2013.01); *G08B 19/00* (2013.01); *G06Q 50/265* (2013.01)

(58) Field of Classification Search
CPC ............ B60S 5/02; G08B 19/00; G06Q 50/26
See application file for complete search history.

(56) References Cited

U.S. PATENT DOCUMENTS 4,220,857 A   9/1980 Bright
4,321,466 A   3/1982 Mallory et al.
(Continued)

FOREIGN PATENT DOCUMENTS

EP     1065113 A2 *  1/2001  ............... B60S 5/02

OTHER PUBLICATIONS

Non-Final Office Action for U.S. Appl. No. 18/114,922 dated Aug. 3, 2023.
(Continued)

*Primary Examiner* — Timothy L Maust
(74) *Attorney, Agent, or Firm* — Run8 Patent Group, LLC; Peter Miller; Brian T. Chew

(57) ABSTRACT

A method for hazard detection and fire prevention during mobile refueling operation includes: accessing a geospatial position of a mobile refueling platform; detecting the geospatial position within a geospatial region as a first condition in a set of conditions, the geospatial region permitted for refueling operation; accessing a distance between the mobile refueling platform and a surface of an object proximal the mobile refueling platform; detecting the distance exceeding a distance threshold as a second condition in the set of conditions; accessing a concentration of a gas proximal the mobile refueling platform; detecting the concentration falling below a concentration threshold as a third condition in the first set of conditions; and in response to the set of conditions corresponding to a set of target conditions for mobile refueling operation, transmitting a control signal to open a fuel valve of the mobile refueling platform.

20 Claims, 5 Drawing Sheets

(56) References Cited

U.S. PATENT DOCUMENTS

| | | | |
|---|---|---|---|
| 4,757,306 | A | 7/1988 | Kimura |
| 4,901,056 | A | 2/1990 | Bellavia et al. |
| 5,153,563 | A | 10/1992 | Goto et al. |
| 5,486,811 | A | 1/1996 | Wehrle et al. |
| 5,523,743 | A | 6/1996 | Rattman et al. |
| 5,568,130 | A | 10/1996 | Dahl |
| 5,659,292 | A | 8/1997 | Tice |
| 5,691,703 | A | 11/1997 | Roby et al. |
| 6,967,582 | B2 | 11/2005 | Tice et al. |
| 7,746,239 | B2 | 6/2010 | Nagashima |
| 7,760,102 | B2 | 7/2010 | Chabanis et al. |
| 7,804,402 | B2 * | 9/2010 | Lang .............. G08B 17/00 340/521 |
| 8,766,807 | B2 | 7/2014 | Gonzales |
| 9,928,709 | B2 * | 3/2018 | Takasu ............ G08B 25/10 |
| 2003/0020617 | A1 | 1/2003 | Tice et al. |
| 2006/0061478 | A1 | 3/2006 | Kim |
| 2006/0261967 | A1 | 11/2006 | Marman et al. |
| 2009/0072981 | A1 | 3/2009 | Powell |
| 2011/0057805 | A1 | 3/2011 | Loepfe et al. |
| 2013/0069543 | A1 | 3/2013 | Mohan et al. |

OTHER PUBLICATIONS

Notice of Allowance and Fees Due for U.S. Appl. No. 17/481,185 dated Nov. 25, 2022.
Notice of Allowance received in U.S. Appl. No. 16/456,310 dated Apr. 13, 2020.
Notice of Allowance received in U.S. Appl. No. 15/374,781 dated Mar. 29, 2018.
Notice of Allowance received in U.S. Appl. No. 15/985,666 dated Mar. 29, 2019.
Notice of Allowance received in U.S. Appl. No. 16/925,858 dated Jun. 18, 2021.
Office Action received in U.S. Appl. No. 16/456,310 dated Sep. 25, 2019.

* cited by examiner

METHOD FOR HAZARD DETECTION AND FIRE PREVENTION IN A MOBILE REFUELING SYSTEM

CROSS-REFERENCE TO RELATED APPLICATIONS

This application claims the benefit of U.S. Provisional Application No. 63/392,082, filed on 25 Jul. 2022, which is incorporated in its entirety by this reference.

This Application is related to U.S. patent application Ser. No. 15/374,781—filed on 9 Dec. 2016 and now U.S. Pat. No. 10,002,510—and U.S. patent application Ser. No. 17/843,212, filed 17 Jun. 2022, each of which is incorporated in its entirety by this reference.

TECHNICAL FIELD

This invention relates generally to the field of mobile refueling and more specifically to a new and useful method for hazard detection and fire prevention within the field of mobile refueling.

DESCRIPTION OF THE EMBODIMENTS

Figure 1:
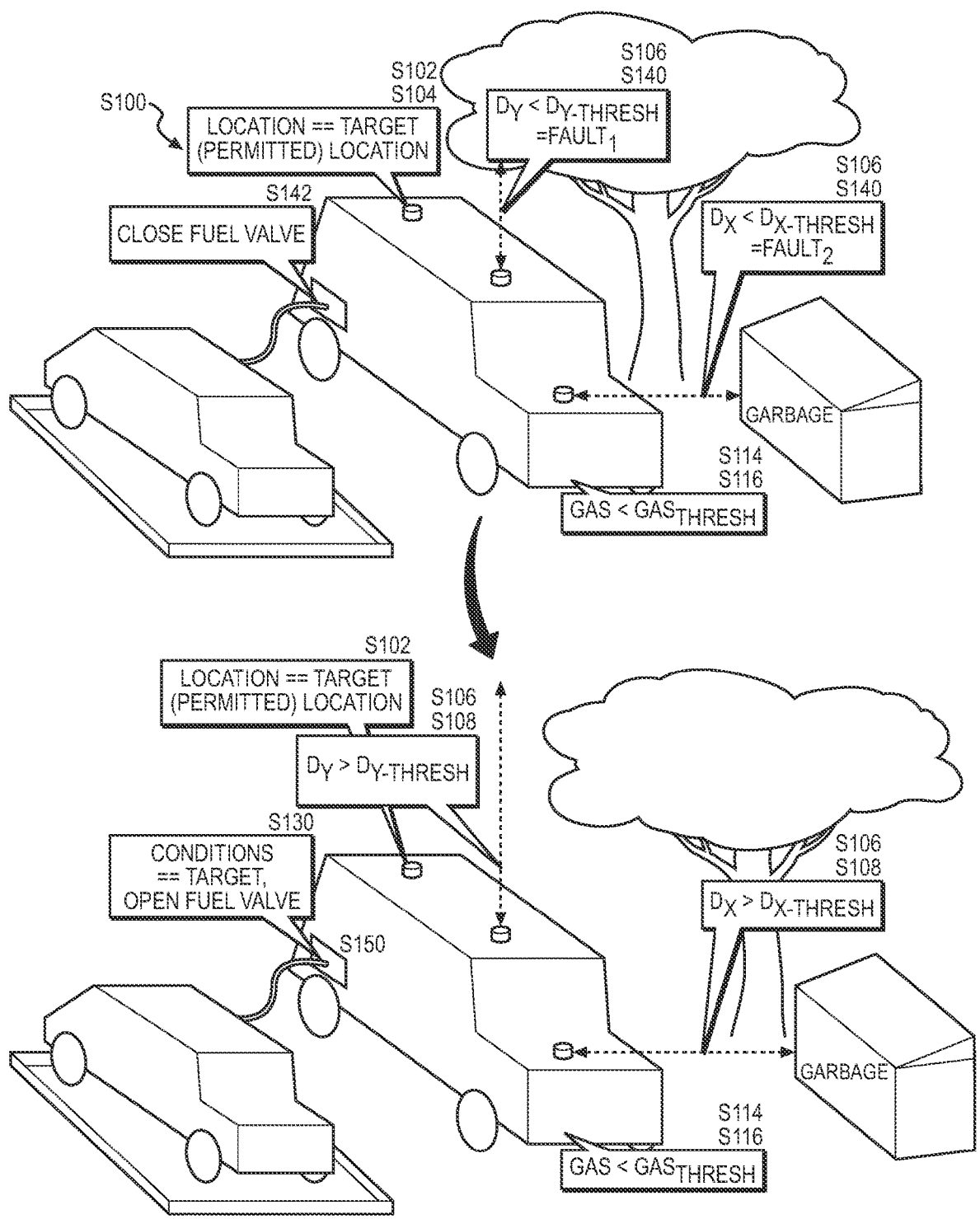
FIG. 1 is a flowchart representation of a method.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods

As shown in FIGS. 1-5, a method S100 for hazard detection and fire prevention during mobile refueling operation includes, during a first time period: accessing a first signal representing a first geospatial position of a mobile refueling platform in Block S102; detecting the first geospatial position within a first geospatial region as a first condition in a first set of conditions of the mobile refueling platform in Block S104, the first geospatial region permitted for refueling operation; accessing a second signal representing a first distance between the mobile refueling platform and a first surface of a first object proximal the mobile refueling platform in Block S106; detecting the first distance exceeding a first distance threshold as a second condition in the first set of conditions in Block S108; accessing a third signal representing a first concentration of a first gas proximal the mobile refueling platform in Block S114; detecting the first concentration falling below a first concentration threshold as a third condition in the first set of conditions in Block S116; and, in response to the first set of conditions corresponding to a first set of target conditions for refueling operation, transmitting a first control signal to open a fuel valve of the mobile refueling platform in Block S130.

1.1 Variation: Intra-Fueling Validation

As shown in FIGS. 1-5, one variation of the method S100 includes, during a first time period: dispensing fuel from a mobile refueling platform in Block S150; accessing a first signal representing a first concentration of a first gas proximal the mobile refueling platform as a first condition in a first set of conditions of the mobile refueling platform in Block S114; accessing a second signal representing a first flow rate of fuel at a fueling manifold of the mobile refueling platform in Block S118; accessing a third signal representing a second flow rate of fuel at a nozzle fluidly coupled to the fueling manifold in Block S120; calculating a first flow rate differential value based on a first difference between the second flow rate and the first flow rate as a second condition in the first set of conditions in Block S122; and accessing a fourth signal representing a first wind speed proximal the mobile refueling platform as a third condition in the first set of conditions in Block S110.

This variation of the method S100 also includes: detecting a fault based on a second difference between the first set of conditions and a first set of target conditions for refueling operation in Block S140, the first set of target conditions including: a first target condition representing a target range of concentrations of the first gas permitted for refueling operation; a second target condition representing a target range of flow rate differential values permitted for refueling operation; and a third target condition representing a target range of wind speeds permitted for refueling operation.

This variation of the method S100 further includes, in response to detecting the fault, transmitting a first control signal to close a fuel valve of the mobile refueling platform in Block S142.

1.2 Variation: Pre-Fueling Validation Failure

As shown in FIGS. 1-5, one variation of the method S100 includes: accessing a first signal representing a first geospatial position of a mobile refueling platform as a first condition in a set of conditions of the mobile refueling platform in Block S102; accessing a second signal representing a first distance between the mobile refueling platform and a first surface of a structure proximal the mobile refueling platform as a second condition in the set of conditions in Block S106; and accessing a third signal representing a first concentration of a first gas proximal the mobile refueling platform as a third condition in the set of conditions in Block S114.

This variation of the method S100 also includes: detecting a fault based on a difference between the set of conditions and a set of target conditions for refueling operation in Block S140, the set of target conditions including: a first target condition representing a target range of geospatial positions permitted for refueling operation; a second target condition representing a target range of distances between the mobile refueling platform and a target surface of a target object proximal the mobile refueling platform permitted for refueling operation; and a third target condition representing a target range of concentrations of the first gas permitted for fueling operation.

This variation of the method S100 further includes, in response to detecting the fault, transmitting a control signal to close a fuel valve of the mobile refueling platform in Block S142.

2. Applications

Generally, Blocks of the method S100 can be executed by a system including a mobile refueling platform, a set of sensors, and a controller: to transport fuel contained in the mobile refueling platform to a location (e.g., within a high-density urban area); to deploy a spill containment system proximal the mobile refueling platform; to receive a vehicle in the spill containment system; to detect a set of conditions exhibited by the mobile refueling platform (e.g., geospatial position, distance from adjacent structures, flow rate) and/or exhibited by an environment surrounding the mobile refueling platform (e.g., wind speed, gas concentration in ambient air, temperature); to identify correspondence between the set of conditions and a set of target conditions approved for refueling operation; to open a fuel valve in response to identifying this correspondence; and to dispense fuel from the mobile refueling platform to the vehicle in response to opening the fuel valve.

Accordingly, Blocks of the method S100 can be executed by the system: to validate the set of conditions according to the set of target conditions; and to control release of fuel from the mobile refueling platform based on a result of validation. Therefore, the system can ensure compliance with governmental ordnances, minimize risk of fire, and/or mitigate an environmental impact of fuel spillage.

2.1 Validation During Refueling Operation

Additionally, Blocks of the method S100 can be executed by the system during refueling operation (i.e., while dispensing fuel to the vehicle): to periodically (e.g., every second, every 30 seconds, every minute) monitor the set of conditions—exhibited by the mobile refueling platform (e.g., fuel flow rate) and/or exhibited by the environment surrounding the mobile refueling platform—based on sensor data; to detect a fault (e.g., fuel leak, fire) based on a difference between the set of conditions and the set of target conditions approved for refueling operation; and to close the fuel valve in response to detecting the fault to prevent release of fuel from the mobile refueling platform.

More specifically, Blocks of the method S100 can be executed by the system: to generate a set of sensor data values characterizing the set of conditions; to detect a fault in response to a sensor data value—in the set of sensor data values—falling outside of a target range of values permitted for refueling operation; to transmit a control signal to close the fuel valve in response to detecting the fault; to generate a notification and/or a record indicating the fault and the set of sensor data values; to serve the notification to an operator; and to store the record in a data repository.

Accordingly, Blocks of the method S100 can be executed by the system: to cease refueling operation in response to detecting a fault; to notify the operator of the fault; and to generate a record of incident responsive to the fault. Therefore, there system can: minimize a volume of fuel spilled due to a fuel leak; reduce risk of ignition; mitigate spread of fire; enable the operator to investigate and/or remediate the fault (or a cause of the fault); and generate an auditable record for analysis.

2.2 Variation: Suburban & Rural Areas

The method S100 as described herein is executed by the system: to transport fuel contained in the mobile refueling platform to a location within a high-density urban area; to identify correspondence between a set of conditions exhibited by the mobile refueling platform and a set of target conditions approved for refueling operation (e.g., target conditions approved for refueling in the high-density urban area); to open a fuel valve in response to identifying this correspondence; and to dispense fuel from the mobile refueling platform to a vehicle in response to opening the fuel valve. However, the system can similarly execute Blocks of the method S100: to transport fuel contained in the mobile refueling platform to a location within a suburban or rural area; to identify correspondence between a set of conditions exhibited by the mobile refueling platform and a set of target conditions approved for refueling operation in the suburban or rural area; to open a fuel valve in response to identifying this correspondence; and to dispense fuel from the mobile refueling platform to a vehicle in response to opening the fuel valve.

3. System

Generally, as shown in FIG. 1, a mobile refueling system (hereinafter "the system") can include: a mobile refueling platform; a set of sensors; and a controller. The set of sensors and the controller can be coupled to the mobile refueling platform, and the set of sensors can be communicatively coupled to the controller.

3.1 Mobile Refueling Platform

Generally, the mobile refueling platform can contain fuel, transport the fuel to a refueling site, and dispense fuel to a vehicle at the refueling site.

In one implementation, the mobile refueling platform can include: a fueling tank configured to store fuel; a fueling pump fluidly coupled to the fueling tank; a fueling manifold fluidly coupled to the fueling pump and including a fuel valve configured to selectively release in response to control signals received from the controller; a fueling hose mounted on a hose reel and fluidly coupled to the fueling manifold; and a nozzle fluidly coupled to a distal end of the fueling hose and configured to fluidly couple to a fuel tank of a vehicle and dispense fuel into the fuel tank of the vehicle in response to actuation of a nozzle handle.

Additionally, the mobile refueling platform can include: an emergency stop device (e.g., button, switch) configured to selectively disable mechanical and/or electrical systems in the mobile refueling platform; and/or a fire suppression system (e.g., inert gas system, chemical fire suppressant) configured to direct a fire suppressant within the mobile refueling platform and/or toward areas proximal the mobile refueling platform.

3.1.1 Fueling Tank Antechamber

In one implementation, the fueling tank can include: a primary chamber configured to store fuel; and an antechamber fluidly coupled to the primary chamber and the fueling pump. The antechamber can be configured to contain a predefined volume of fuel (e.g., fifteen gallons, 25 gallons) to be dispensed in a single instance of refueling operation.

In one example, the fueling tank includes a secondary pump fluidly coupling the primary chamber and the antechamber. In this example, during a first time period preceding an instance of refueling operation, the secondary pump draws fuel from the primary chamber to the antechamber. In response to the secondary pump drawing fuel from the primary chamber to the antechamber, the antechamber contains a maximum volume of fuel permitted to be dispensed in a single instance of refueling operation (e.g., fifteen gallons). During refueling operation, the fueling pump draws fuel from the antechamber to the fueling manifold.

Accordingly, by implementing an antechamber separating a first volume of fuel—to be dispensed during refueling operation—from a second volume of fuel stored by the mobile refueling platform, the system can thereby reduce an impact of a fuel spill or fire occurring during refueling operation.

3.1.2 Spill Containment System

Generally, the mobile refueling platform can include a spill containment system including a spill containment tray and a spill repository. The mobile refueling platform can deploy the spill containment tray adjacent the mobile refueling platform during refueling operation. Upon completion of refueling operation, the mobile refueling platform can retract the spill containment tray.

In one implementation, the spill containment tray can define: a base configured to receive a vehicle to be refueled; and a set of retaining walls connected to edges of the base and configured to contain fuel—spilled (e.g., from the fueling nozzle) during refueling operation—within the spill containment tray. The spill containment tray can further define a set of channels to direct fuel to the spill repository. In this implementation, the spill containment tray can include the spill repository.

In one variation, the mobile refueling platform can include the spill repository and an inlet fluidly coupled to the spill repository, and the spill containment tray can include an outlet fluidly coupled to the set of channels. In this variation, upon completion of refueling operation, the mobile refueling platform can retract the spill containment tray and fluidly couple the outlet of the spill containment tray and the inlet of the mobile refueling platform and direct a volume of the spilled fuel contained in the spill containment tray to the spill repository in the mobile refueling platform.

Accordingly, by implementing the spill containment tray during refueling operation, the system can thereby minimize an environmental impact of spilled fuel and/or other fluids (e.g., motor oil) during refueling operation.

3.2 Sensors

Generally, the system can include a set of sensors coupled to the mobile refueling platform, each sensor: generating sensor data (e.g., analog values, digital values) in a sense domain (e.g., geospatial position, distance, gas concentration, wind, temperature, light, fluid flow); and transmitting the sensor data to the controller. For example, the set of sensors can be mounted on the mobile refueling platform.

3.2.1 Location Sensor

In one implementation, the system can include a location sensor: generating a signal representing a geospatial position (e.g., geospatial coordinates) of the mobile fueling platform; and transmitting the signal representing the geospatial position of the mobile fueling platform to the controller.

3.2.2 Distance Sensor

In on implementation, the system can include a distance sensor (e.g., light detection and ranging sensor, ultrasonic sensor): generating a signal representing a distance between the mobile refueling platform and a surface of an object proximal the mobile refueling platform; and transmitting the signal representing this distance to the controller. The system can include a set of distance sensors—arranged on the mobile refueling platform in a set of positions and/or orientations—to capture distances of surfaces of objects surrounding the mobile refueling platform.

In one example, the system includes a first distance sensor arranged in a first position and a first orientation on the mobile refueling platform. In this example, the first distance sensor generates data representing a first distance (e.g., lateral distance) between the mobile refueling platform and a first surface of a first object (e.g., wall, structure, waste container) adjacent the mobile refueling platform.

In another example, the system includes a second distance sensor arranged in a second position and a second orientation on the mobile refueling platform. In this example, the second distance sensor generates data representing a second distance (e.g., vertical distance) between the mobile refueling platform and a second surface of a second object (e.g., power line, bridge, ceiling) above the mobile refueling platform.

In another implementation, the system can include a second set of distance sensors—arranged on the spill containment tray in a set of positions and/or orientations—to capture distances of surfaces of objects surrounding the spill containment tray.

3.2.3 Wind Sensor

In one implementation, the system can include a wind sensor: generating a signal representing a wind speed (and direction) proximal the mobile refueling platform; and transmitting the signal representing the wind speed to the controller.

3.2.4 Gas Concentration Sensor

In one implementation, the system can include a gas concentration sensor: generating a signal representing a concentration of a gas (e.g., carbon monoxide, carbon dioxide, volatile organic compounds, benzene, sulfur hexafluoride, hydrogen) in ambient air proximal the mobile refueling platform; and transmitting the signal representing the concentration of the gas to the controller.

In another implementation, the system can include a set of gas concentration sensors, each gas concentration sensor—in the set of gas concentration sensors—generating a signal representing a concentration of a particular gas in a set of gases.

3.2.5 Flow Sensor

Generally, the system can include a set of flow sensors monitoring fuel flow during refueling operation.

In one implementation, the system can include a first flow sensor: generating a first signal representing a first flow rate of fuel at the fueling manifold of the mobile refueling platform; and transmitting the first signal to the controller. Additionally, the system can include a second flow sensor: generating a second signal representing a second flow rate of fuel at the nozzle of the mobile refueling platform; and transmitting the second signal to the controller.

In another implementation, the system can include a flow sensor: generating a signal representing a volume of fuel dispensed during refueling operation; and transmitting the signal representing this volume of fuel to the controller.

3.2.6 Other Sensors

In one implementation, the system can include additional sensors, such as a temperature sensor, a light sensor, and/or a motion sensor, etc.

In one example, the system includes a temperature sensor: generating a signal representing a temperature proximal the mobile refueling platform; and transmitting the signal representing this temperature to the controller.

In another example, the system includes a light sensor: generating a signal representing an intensity of incident light across a light spectrum(s) (e.g., visible light, infrared light, ultraviolet light); and transmitting the signal representing this light intensity to the controller.

3.3 Controller

Generally, the system can include a controller coupled to the mobile refueling platform and communicatively coupled to the set of sensors. The controller can: receive sensor data from the set of sensors; validate a set of conditions of the mobile refueling platform—based on the sensor data—according to a set of target conditions for refueling operation; and selectively control the fuel valve based on a result of validation.

More specifically, in response to detecting the set of conditions corresponding to the set of target conditions for refueling operation, the controller can transmit a first control signal to open the fuel valve to enable fuel to be dispensed from the mobile refueling platform. Alternatively, in response to detecting a difference between the set of conditions and the set of target conditions, the controller can transmit a second control signal to close the fuel valve to prevent fuel from being dispensed from the mobile refueling platform.

4. Target Conditions

Generally, the controller can access a set of target conditions permitted for refueling operation.

In one implementation, the controller can access the set of target conditions, each target condition defining a range of values (or a set of ranges of values) permitted for refueling operation.

In one example, the controller accesses the target condition representing the range of values defining a first threshold value characterizing a lower boundary (or "minimum value") of the range of values permitted for refueling operation.

In another example, the controller accesses the target condition representing the range of values defining a second threshold value characterizing an upper boundary (or "maximum value") of the range of values permitted for refueling operation.

5. Mobile Refueling & Validation

Figure 2:
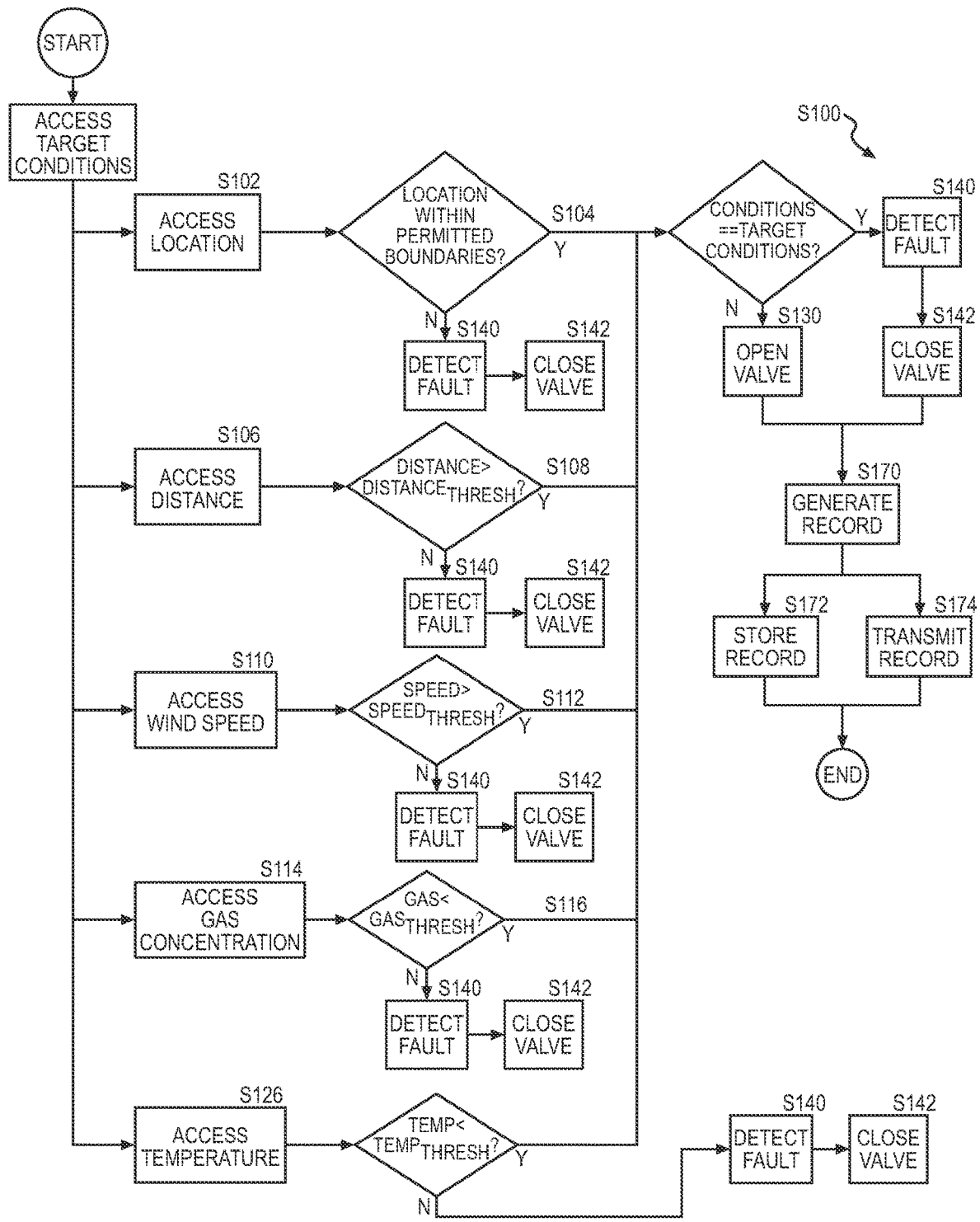
FIG. 2 is a flowchart representation of one variation of the method.
Figure 3:
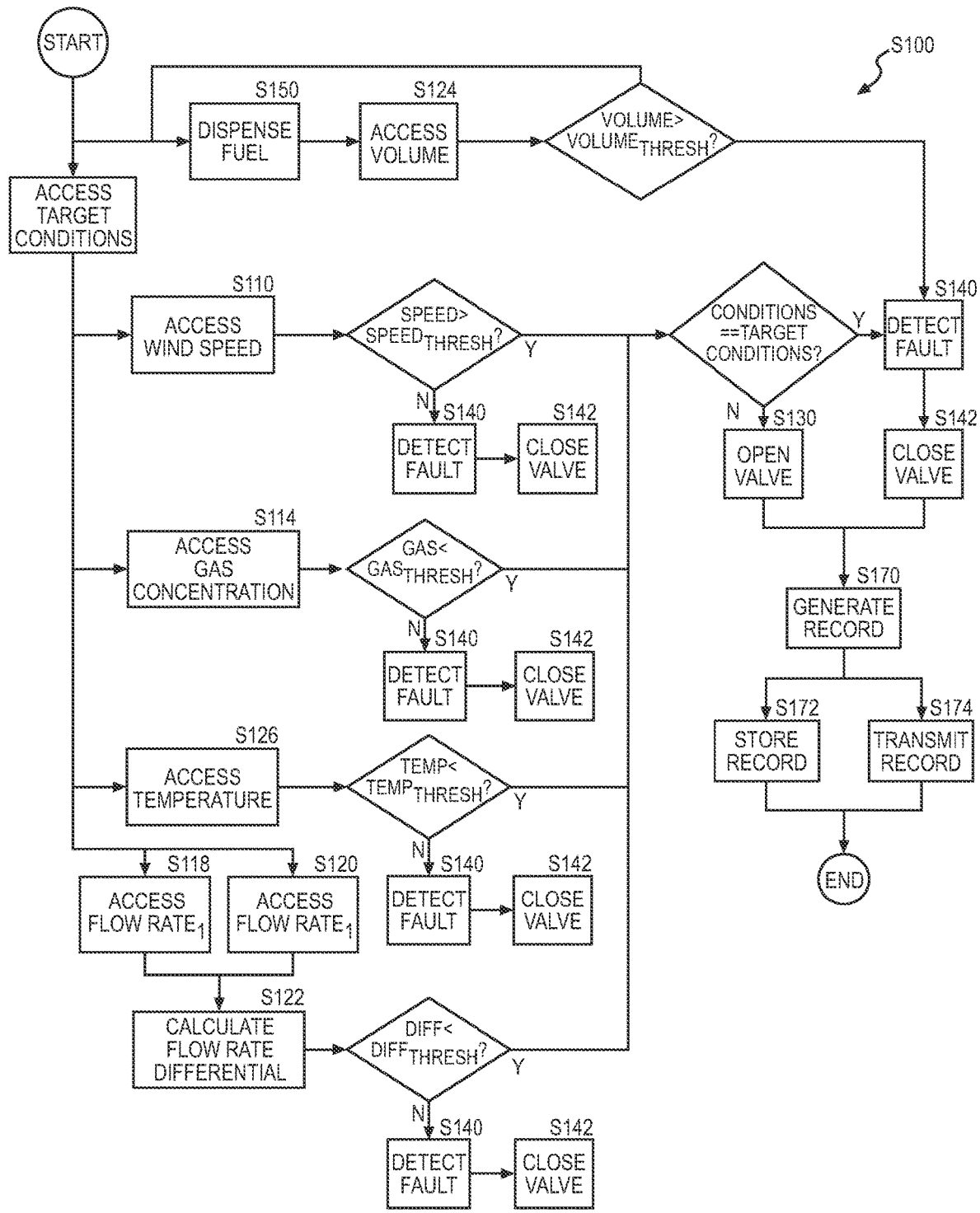
FIG. 3 is a flowchart representation of one variation of the method.

In one implementation, as shown in FIGS. 1-3, the mobile refueling platform can transport fuel to a refueling location (e.g., a parking area proximal an apartment complex and containing a high density of vehicles) for refueling operation. The controller can: receive signals from the set of sensors; detect conditions of the mobile refueling platform based on these signals; and open a fuel valve in response to these conditions corresponding to target conditions for refueling operation (e.g., sensor data values fall within target ranges of values permitted for refueling operation). The mobile refueling platform can then dispense fuel to a vehicle fluidly coupled thereto.

In one variation, the controller can: detect a fault based on a difference between the conditions of the mobile refueling platform and the target conditions for refueling operation (e.g., a sensor data value falls outside of a target range of values permitted for refueling operation); and close the fuel valve to prevent release of fuel from the mobile refueling platform.

Accordingly, the system can: perform a validation procedure verifying correspondence between the conditions of the mobile refueling platform and the target conditions permitted for refueling operation; and selectively control the fuel valve based on a result of the validation procedure. Therefore, the system can thereby minimize risk of a fuel spill and/or fire during refueling operation in a high-density urban environment.

5.1 Location Verification

Blocks of the method S100 recite: accessing a first signal representing a first geospatial position of a mobile refueling platform in Block S102; and detecting the first geospatial position within a first geospatial region as a first condition in a first set of conditions of the mobile refueling platform in Block S104, the first geospatial region permitted for refueling operation.

In one implementation, the controller can access a first target condition representing a range of geospatial positions (e.g., geospatial coordinates) permitted for refueling operation, the range of geospatial positions defining boundaries of a target region in which mobile refueling is permitted. Additionally, the controller can access the first target condition representing a set of ranges of geospatial positions defining boundaries of a set of target regions permitted for mobile refueling. In one example, the controller accesses the first target condition representing a set of boundaries of an area within a digital map in which mobile refueling operation is permitted.

In another implementation, in Block S102, the controller can access a signal representing a geospatial position of the mobile refueling platform as a first condition (or "location condition") of the mobile refueling platform. For example, the controller can access the signal (e.g., geospatial coordinates) from a location sensor mounted on the mobile refueling platform.

In one variation, the controller can: access the signal representing the geospatial position of the mobile refueling platform in Block S102; and detect the geospatial position within a particular geospatial region as the first condition of the mobile refueling platform in Block S104. More specifically, the controller can: access a data structure (e.g., table, digital map) correlating geospatial positions with a set of geospatial regions; and identify the geospatial position falling within the particular geospatial region in the set of geospatial regions based on the data structure. The controller can access the data structure correlating geospatial positions with the set of geospatial regions including: a first subset of geospatial regions permitted for refueling operation; and a second subset of geospatial regions prohibited from refueling operation.

In one implementation, the controller can detect correspondence between the first condition (i.e., the location condition) of the mobile refueling platform and the first target condition. For example, the controller can detect correspondence between the first condition and the first target condition based on the geospatial position of the mobile refueling platform falling within a geospatial region permitted for refueling operation (i.e., the geospatial position of the mobile refueling platform falling within a range of geospatial positions defining a geospatial region permitted for mobile refueling). The controller can record a nominal status value associated with the first condition in response to the first condition corresponding to the first target condition.

Alternatively, the controller can detect a difference between the first condition and the first target condition based on the geospatial position of the mobile refueling platform falling outside of a geospatial region permitted for refueling operation. More specifically, the controller can detect the difference between the first condition and the first target condition based on the geospatial position of the mobile refueling platform falling outside of the range of geospatial positions defining a geospatial region permitted for mobile refueling. The controller can: detect a fault based on the difference between the first condition and the first target condition in Block S140; and record a fault status value associated with the first condition. Additionally, in Block S142, the controller can transmit a signal to close the fuel valve in response to detecting the fault.

Accordingly, the system can verify that the mobile refueling platform is positioned in an area permitted for refueling operation. Therefore, the system can ensure compliance with safety and/or environmental regulations.

5.2 Distance Verification

Blocks of the method S100 recite accessing a second signal representing a first distance between the mobile refueling platform and a first surface of a first object proximal the mobile refueling platform in Block S106; and detecting the first distance exceeding a first distance threshold as a second condition in the first set of conditions in Block S108.

In one implementation, the controller can access a second target condition representing a range of distances—between the mobile refueling platform and a surface of an object proximal the mobile refueling platform—permitted for refueling operation. More specifically, the controller can access the second target condition representing the range of distances defining a distance threshold (e.g., ten feet, 100 feet) between the mobile refueling platform and the surface of the object proximal the mobile refueling platform, the distance threshold characterizing a lower boundary (or "minimum distance") of the range of distances.

In another implementation, in Block S106, the controller can access a signal (e.g., from a distance sensor) representing a distance—between the mobile refueling platform and a surface of an object (e.g., wall, structure, waste receptacle) proximal the mobile refueling platform—as a second condition (e.g., distance condition) of the mobile refueling platform. More specifically, the controller can: access a frame captured by an optical sensor arranged on the mobile refueling platform, the frame including a set of distance values (or pixel values) relative to a field of view of the optical sensor; isolate a cluster of distance values, in the set of distance values, representing the surface in the frame; and derive the distance between the mobile refueling platform and the surface based on the cluster of distance values.

In one variation, in Block S108, the controller can detect the distance exceeding the distance threshold as the second condition of the mobile refueling platform.

Alternatively, the controller can detect the distance falling below the distance threshold as the second condition.

In one implementation, the controller can detect correspondence between the second condition of the mobile refueling platform and the second target condition. For example, the controller can detect correspondence between the second condition and the second target condition based on the distance between the mobile refueling platform and the surface of the object proximal the mobile refueling platform exceeding the distance threshold. The controller can record a nominal status value associated with the second condition in response to the second condition corresponding to the second target condition.

Alternatively, the controller can detect a difference between the second condition and the second target condition based on the distance between the mobile refueling platform and the surface of the object proximal the mobile refueling platform falling below the distance threshold. The controller can: detect a fault based on the difference between the second condition and the second target condition in Block S140; and record a fault status value associated with the second condition. Additionally, in Block S142, the controller can transmit a signal to close the fuel valve in response to detecting the fault.

The controller can repeat the foregoing process for a group of signals—captured by a distance sensor (or by a set of distance sensors)—representing distances between the mobile refueling platform and surfaces of objects proximal the mobile refueling platform.

Accordingly, by verifying that the mobile refueling platform is positioned at distances exceeding a minimum distance from objects proximal the mobile refueling platform, the system can thereby reduce risk of a fire spreading to these objects.

5.2.1 Vertical Distance Verification

Additionally, the controller can repeat the foregoing process for a signal representing a vertical distance between the mobile refueling platform and a surface of an object positioned above the mobile refueling platform.

In one implementation, the controller can access the second target condition representing a second range of distances—between the mobile refueling platform and a surface of an object above the mobile refueling platform—permitted for refueling operation. More specifically, the controller accesses the second target condition representing the second range of distances defining a second distance threshold (e.g., five feet, ten feet) between the mobile refueling platform and the surface of the object above the mobile refueling platform, the second distance threshold characterizing a lower boundary (or "minimum vertical distance") of the second range of distances.

In this implementation, the controller can access a signal representing a vertical distance between the mobile refueling platform and a surface of an object positioned above the mobile refueling platform; and detect the vertical distance exceeding the second distance threshold corresponding to a minimum vertical distance.

5.2.2 Distance Verification by Object Type

In one implementation, the controller can access the second target condition representing a set of ranges of distances—between the mobile refueling platform and a surface of an object proximal the mobile refueling platform—permitted for refueling operation, each range of distances defining a distance threshold based on an object type in a set of object types.

For example, the controller can access the second target condition representing the set of ranges of distances including: a first range of distances corresponding to a first object type (e.g., residential building), the first range of distances defining a first distance threshold of 50 feet; and a second range of distances corresponding to a second object type (e.g., waste receptacle), the second range of distances defining a second distance threshold of ten feet.

Figure 4:
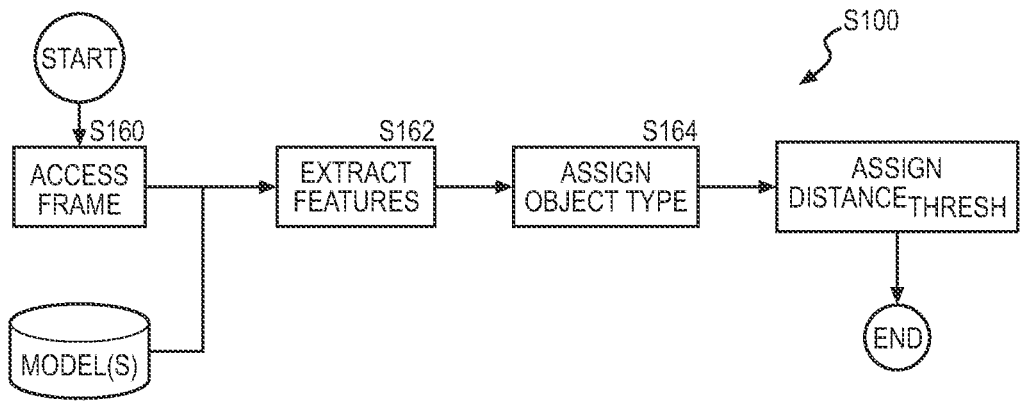
FIG. 4 is a flowchart representation of one variation of the method.

In another implementation, as shown in FIG. 4, the controller can: access a frame—captured by an optical sensor arranged on the mobile refueling platform—including a set of distance values relative to a field of view of the optical sensor in Block S160; extract a set of features of the object based on the set of distance values in Block S162; and assign an object type to the object based on the set of features in Block S164. More specifically, the controller can implement computer vision techniques (e.g., edge detection, object recognition, template matching, machine learning algorithms) to extract the set of features representing the object from the frame and assign the object type to the object based on the set of features.

The controller can then implement methods and techniques described above to: access a signal representing a distance—between the mobile refueling platform and a surface of the object—as a condition of the mobile refueling platform; detect the distance exceeding a distance threshold corresponding to the object type assigned to the object; and detect correspondence between the condition and the second target condition based on the distance exceeding the distance threshold corresponding to the object type assigned to the object.

Alternatively, the controller can: detect the distance falling below the distance threshold corresponding to the object type of the object; and detect a fault based on a difference between the condition and the second target condition (e.g., based on the distance falling below the distance threshold corresponding to the object type of the object). Additionally, the controller can transmit a signal to close the fuel valve in response to detecting the fault.

In one example, the controller: accesses a first frame depicting a first object (e.g., residential building); extracts a first set of features representing the first object from the first frame; assigns a "residential building" object type to the first object depicted in the first frame based on the first set of features; accesses a first distance threshold of 5o feet corresponding to the "residential building" object type; accesses a first signal representing a first distance of twelve feet between the mobile refueling platform and the first object; and detects a fault based on the first distance falling below the first distance threshold corresponding to the "residential building" object type.

In another example, the controller: accesses a second frame depicting a second object (e.g., waste receptacle); extracts a second set of features representing the second object from the second frame; assigns a "waste receptacle" object type to the second object depicted in the second frame based on the second set of features; accesses a second distance threshold of ten feet corresponding to the "waste receptacle" object type; accesses a second signal representing a second distance of twelve feet between the mobile refueling platform and the second object; and detects the second distance exceeding the second distance threshold as a condition of the mobile refueling platform, the condition corresponding to the second target condition representing a second range of distances corresponding to the "waste receptacle" object type and defining the second distance threshold of ten feet.

In yet another example, the controller: accesses a third frame depicting a third object (e.g., stormwater drain); extracts a third set of features representing the third object from the third frame; assigns a "stormwater drain" object type to the third object depicted in the third frame based on the third set of features; accesses a third distance threshold of 25 feet corresponding to the "stormwater drain" object type; accesses a third signal representing a third distance of twenty feet between the mobile refueling platform and the third object; and detects a fault based on the third distance falling below the third distance threshold corresponding to the "stormwater drain" object type.

Accordingly, the system can: distinguish between objects—proximal the mobile refueling platform—exhibiting different object types; implement different minimum distance thresholds for these object types; and verify that the mobile refueling platform is positioned at distances exceeding these minimum distances thresholds from these objects. Therefore, the system can more flexibly position the mobile refueling platform in a high-density urban environment for refueling operation while minimizing risk of fire to adjacent objects and complying with safety regulations.

5.3 Wind Detection

Blocks of the method S100 recite: accessing a fourth signal representing a first wind speed proximal the mobile refueling platform in Block S110; and detecting the first wind speed within a first win d speed range falling below a first wind speed threshold as a fourth condition in the first set of conditions in Block S112.

In one implementation, the controller can access a fourth target condition representing a range of wind speeds proximal the mobile refueling platform permitted for refueling operation. More specifically, the controller accesses the fourth target condition representing the range of wind speeds defining a wind speed threshold (e.g., 25 miles per hour, 40 miles per hour) characterizing an upper boundary (or "maximum wind speed") of the range of wind speeds permitted for refueling operation.

In one variation, the controller can access the fourth target condition representing a set of ranges of wind speeds proximal the mobile refueling platform permitted for refueling operation. For example, the controller can access the fourth target condition representing the set of ranges of wind speeds defining: a first range of wind speeds (e.g., 0-15 miles per hour); and a second range of wind speeds (e.g., 15-25 miles per hour), the first range of wind speeds and the second range of wind speeds falling below the wind speed threshold. The controller can access the fourth target condition representing the set of ranges of wind speeds further defining additional ranges of wind speeds.

In another implementation, in Block S sensor, the controller can access a signal (e.g., from a wind sensor) representing a wind speed proximal the mobile refueling platform as a fourth condition (e.g., wind speed condition) of the mobile refueling platform.

In one variation, in Block S112, the controller can detect the wind speed falling below the wind speed threshold as the fourth condition of the mobile refueling platform. More specifically, the controller can detect the wind speed within a wind speed range falling below the wind speed threshold.

Alternatively, the controller can detect the wind speed exceeding below the wind speed threshold as the fourth condition.

In one implementation, the controller can detect correspondence between the fourth condition of the mobile refueling platform and the fourth target condition. For example, the controller can detect correspondence between the fourth condition and the fourth target condition based on the wind speed proximal the mobile refueling platform falling below the wind speed threshold. The controller can record a nominal status value associated with the fourth condition in response to the fourth condition corresponding to the fourth target condition.

Alternatively, the controller can detect a difference between the fourth condition and the fourth target condition based on the wind speed proximal the mobile refueling platform exceeding the wind speed threshold. The controller can: detect a fault based on the difference between the fourth condition and the fourth target condition in Block S140; and record a fault status value associated with the fourth condition. Additionally, in Block S142, the controller can transmit a signal to close the fuel valve in response to detecting the fault.

Accordingly, by detecting a fault based on a wind speed proximal the mobile refueling platform exceeding the wind speed threshold, the system can prohibit refueling operation during a period exhibiting high wind speeds, thereby reducing risk of a fire that may rapidly spread to adjacent structures based on these high wind speeds.

5.4 Gas Detection

Blocks of the method S100 recite: accessing a third signal representing a first concentration of a first gas proximal the mobile refueling platform in Block S114; and detecting the first concentration falling below a first concentration threshold as a third condition in the first set of conditions in Block S116.

In one implementation, the controller can access a third target condition representing a range of concentrations of a gas (e.g., carbon monoxide, carbon dioxide, volatile organic compounds, benzene, sulfur hexafluoride, hydrogen) in ambient air proximal the mobile refueling platform permitted for refueling operation. More specifically, the controller accesses the third target condition representing the range of concentrations (e.g., 0-10 parts per million) of the gas defining a concentration threshold (e.g., ten parts per million) characterizing an upper boundary (or "maximum concentration") of the range of concentrations of the gas permitted for refueling operation.

In another implementation, in Block S114, the controller can access a signal (e.g., from a gas concentration sensor) representing a concentration of the gas proximal the mobile refueling platform as a third condition (e.g., gas concentration condition) of the mobile refueling platform.

In one variation, in Block S116, the controller can detect the concentration of the gas falling below the concentration threshold as the third condition of the mobile refueling platform.

Alternatively, the controller can detect the concentration of the gas exceeding the concentration threshold as the third condition.

In one implementation, the controller can detect correspondence between the third condition of the mobile refueling platform and the third target condition. For example, the controller can detect correspondence between the third condition and the third target condition based on the concentration of the gas in ambient air proximal the mobile refueling platform falling below the concentration threshold. The controller can record a nominal status value associated with the third condition in response to the third condition corresponding to the third target condition.

Alternatively, the controller can detect a difference between the third condition and the third target condition based on the concentration of the gas in ambient air proximal the mobile refueling platform exceeding the concentration threshold. The controller can: detect a fault based on the difference between the third condition and the third target condition in Block S140; and record a fault status value associated with the third condition. Additionally, in Block S142, the controller can transmit a signal to close the fuel valve in response to detecting the fault.

In one example, the controller: accesses a first concentration threshold of ten parts per million of a volatile organic compound (e.g., alkenes, cycloalkanes, aromatics); accesses a first signal—representing a first concentration of 100 parts per million of the volatile organic compound in ambient air proximal the mobile refueling platform—from a first gas concentration sensor arranged within an interstitial space between an exterior of the fueling tank and an interior of a shroud surrounding the fueling tank; and detects a fault based on the first concentration exceeding the concentration threshold.

In another example, the controller: accesses a second signal—representing a second concentration of five parts per million of the volatile organic compound in ambient air proximal the mobile refueling platform—from a second gas concentration sensor arranged at the nozzle of the mobile refueling platform; and detects the second concentration of the volatile organic compound falling below the concentration threshold as a condition of the mobile refueling platform, the condition corresponding to the third target condition representing a range of concentrations defining the concentration threshold of ten parts per million.

Accordingly, by detecting a fault based on a concentration of the gas exceeding a maximum concentration threshold, the system can thereby: detect a potential fuel leak; and cease refueling operation to minimize further spread of the fuel leak and/or risk of fire.

5.4.1 Gas Detection Based on Wind Speed

In one implementation, the controller can access the third target condition representing a set of ranges of concentrations of a gas permitted for refueling operation, each range of concentrations defining a concentration threshold based on a wind speed proximal the mobile refueling platform.

For example, the controller can access the third target condition representing the set of ranges of concentrations including: a first range of concentrations corresponding to a first wind speed range (e.g., 0-15 miles per hour) proximal the mobile refueling platform, the first range of concentrations defining a first concentration threshold of ten parts per million of the gas; and a second range of concentrations corresponding to a second wind speed range (e.g., 15-25 miles per hour)—exceeding the first wind speed range—proximal the mobile refueling platform, the second range of concentrations defining a second concentration threshold of eight parts per million of the gas.

In another implementation, the controller can implement methods and techniques described above to: access a first signal representing a wind speed proximal the mobile refueling platform; detect the wind speed falling within a first wind speed range in a set of wind speed ranges; access a first range of concentrations corresponding to the first wind speed range, the first range of concentrations defining a first concentration threshold based on the first wind speed range.

In this implementation, the controller can implement methods and techniques described above to: access a second signal representing a concentration of the gas proximal the mobile refueling platform as a condition of the mobile refueling platform; detect the concentration of the gas falling below the first concentration threshold corresponding to the first wind speed range; and detect correspondence between the condition and the third target condition based on the concentration of the gas falling below the first concentration threshold.

Alternatively, the controller can: detect the concentration of the gas exceeding the first concentration threshold corresponding to the first wind speed range; and detect a fault based on a difference between the condition and the third target condition (e.g., based on the concentration of the gas exceeding the first concentration threshold corresponding to the first wind speed range). Additionally, the controller can transmit a signal to close the fuel valve in response to detecting the fault.

In one example, the controller: detects a first wind speed of fourteen miles per hour proximal the mobile refueling platform, the first wind speed falling within a first wind speed range (e.g., 0-15 miles per hour); accesses a first concentration threshold of ten parts per million of a volatile organic compound, the first concentration threshold corresponding to the first wind speed range; accesses a first signal—representing a first concentration of nine parts per million of the volatile organic compound in ambient air proximal the mobile refueling platform; and detects the first concentration of the volatile organic compound falling below the first concentration threshold as a condition of the mobile refueling platform, the condition corresponding to the third target condition representing a range of concentrations defining the first concentration threshold of ten parts per million.

In another example, the controller: detects a second wind speed of sixteen miles per hour proximal the mobile refueling platform, the second wind speed falling within a second wind speed range (e.g., 15-25 miles per hour); accesses a second concentration threshold of eight parts per million of the volatile organic compound, the second concentration threshold corresponding to the second wind speed range; accesses a second signal—representing a second concentration of nine parts per million of the volatile organic compound in ambient air proximal the mobile refueling platform; and detects a fault based on the second concentration exceeding the second concentration threshold corresponding to the second wind speed range. In response to detecting the second concentration exceeding the second concentration threshold corresponding to the second wind speed range, the controller can transmit a second control signal to close the fuel valve of the mobile refueling platform.

Accordingly, the system can implement a lower maximum concentration threshold of the gas for higher wind speeds proximal the mobile refueling platform. Therefore, the system can compensate for decreased accuracy in detecting a concentration of the gas in ambient air proximal the mobile refueling platform due to the higher wind speeds (e.g., due to particles of the gas in ambient air being diffused by high wind).

5.5 Fire Detection & Suppression

Blocks of the method S100 recite: accessing a fourth signal representing a first temperature proximal the mobile refueling platform in Block S126; and, in response to detecting the first temperature exceeding a first temperature threshold, transmitting a second control signal to close the fuel valve of the mobile refueling platform in Block S142. Block S144 of the method S100 recites transmitting a third control signal to release fire suppressant.

Generally, in Blocks S142 and S144, the system can detect precursor conditions to a fire and/or an incipient (or developing) fire within or proximal the fueling area data collected by the set of sensors.

In one implementation, the controller can: access a target condition representing a range of temperatures permitted for refueling operation, the range of temperatures defining a temperature threshold (e.g., 375 degrees Fahrenheit) characterizing an upper boundary (or "maximum temperature") of the range of temperatures; and access a signal representing a temperature proximal the mobile refueling platform as a condition (e.g., temperature condition, fire condition) of the mobile refueling platform in Block S126. In response to the temperature exceeding the temperature threshold, the controller can: detect a fault based on the temperature exceeding the temperature threshold in Block S140; transmit a first control signal to close the fuel valve of the mobile refueling platform in Block S142; and transmit a second control signal to release fire suppressant in Block S144.

Additionally, the controller can transmit a third control signal to the emergency stop device to disable mechanical and/or electrical systems in the mobile refueling platform.

In another implementation, the system can implement methods and techniques described in U.S. patent application Ser. No. 15/374,781 to: access a signal representing an intensity of incident light at a location proximal the mobile refueling platform; and detect a fire based on the intensity of light corresponding to a target intensity of light characteristic of fire. In this implementation, the controller can: access a target condition representing the target intensity of light characteristic of fire; and access the signal representing the intensity of incident light as a condition (e.g., light condition, fire condition) of the mobile refueling platform. In response to detecting the fire proximal the mobile refueling platform, the controller can: detect a fault based on the intensity of light corresponding to the target intensity of light characteristic of fire; transmit a fourth control signal to close the fuel valve of the mobile refueling platform; transmit a fifth control signal to release fire suppressant; and transmit a sixth control signal to the emergency stop device to disable mechanical and/or electrical systems in the mobile refueling platform.

5.6 Validation Result

Block S130 of the method S100 recites, in response to the first set of conditions corresponding to a first set of target conditions, transmitting a first control signal to open a fuel valve of the mobile refueling platform.

Block S142 of the method S100 recites, in response to detecting the fault, transmitting a control signal to close a fuel valve of the mobile refueling platform.

Generally, the controller can: access a set of target conditions (e.g., a first set of target conditions for pre-fueling validation) permitted for refueling operation; detect a set of conditions (e.g., location condition, distance condition(s), wind condition, gas concentration condition, temperature condition, light condition, fire condition) of the mobile refueling platform; and compare the set of conditions to the set of target conditions. For example, the first set of target conditions can include: a first target condition representing a target range of geospatial positions permitted for refueling operation; a second target condition representing a target range of distances between the mobile refueling platform and a target surface of a target object proximal the mobile refueling platform permitted for refueling operation; and a third target condition representing a target range of concentrations of the first gas permitted for fueling operation.

In one implementation, in response to the set of conditions corresponding to the set of target conditions, the controller can transmit a control signal to open a fuel value of the mobile refueling platform in Block S130. More specifically, the controller can transmit the control signal to open the fuel valve in response to: detecting a geospatial position of the mobile refueling platform within a geospatial region permitted for refueling operation; detecting a distance—between the mobile refueling platform and a surface of an object proximal the mobile refueling platform—exceeding a distance threshold; and detecting a concentration of a gas in ambient air proximal the mobile refueling platform falling below a concentration threshold. The mobile refueling platform can then initiate refueling operation and dispense fuel responsive to the control signal to open the fuel value.

In another implementation, the controller can: detect a fault based on a difference between the set of conditions and the set of target conditions in Block S140; and, in response to detecting the fault, transmit a control signal to close the fuel valve of the mobile refueling platform in Block S142. For example, the controller can detect the fault based on: the geospatial position of the mobile refueling platform outside of a geospatial region permitted for refueling operation; the distance—between the mobile refueling platform and the surface of the object proximal the mobile refueling platform—falling below the distance threshold; and/or the concentration of the gas in ambient air proximal the mobile refueling platform exceeding the concentration threshold.

Accordingly, the system can: perform a pre-fueling validation procedure—prior to initiating refueling operation and dispensing fuel from the mobile refueling platform to the vehicle—verifying correspondence between the conditions of the mobile refueling platform and the target conditions permitted for refueling operation; and selectively control the fuel valve based on a result of the pre-fueling validation procedure. Therefore, the system can thereby minimize risk of a fuel spill and/or fire during subsequent refueling operation.

6. Faults

Figure 5:
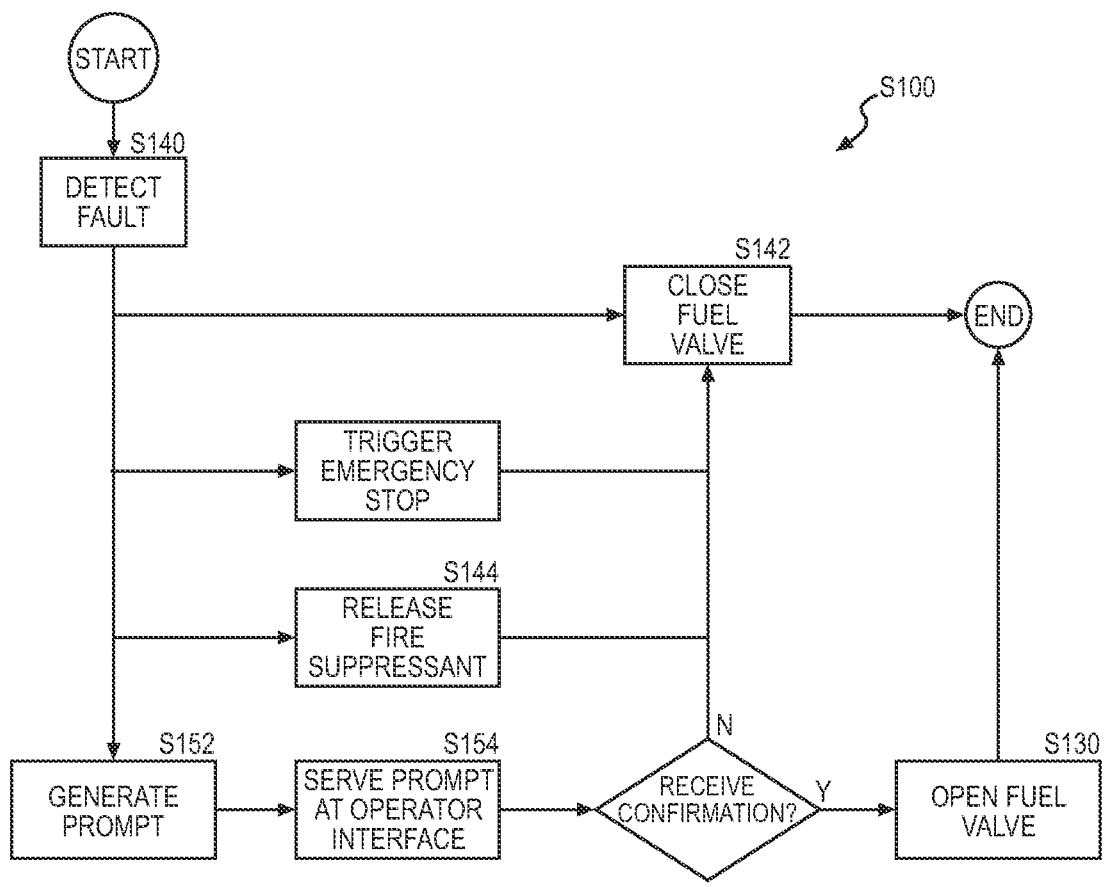
FIG. 5 is a flowchart representation of one variation of the method.

Generally, as shown in FIG. 5, the controller can: detect a fault based on a difference between a condition of the mobile refueling platform and a target condition permitted for refueling operation; and transmit a control signal to close the fuel valve in response to detecting the fault.

Additionally, in response to detecting the fault, the controller can: transmit a notification—indicating the fault—to an operator and/or a remote monitoring system; and transmit a control signal to the emergency stop device to disable mechanical and/or electrical systems in the mobile refueling platform.

6.1 Fault Duration

In one implementation, the controller can detect a fault—exhibiting a time duration—based on a difference between a condition and a target condition. In response to detecting the fault, the controller can transmit a control signal to close the fuel valve for a period of time corresponding to the time duration.

In one example, during a first time period, the controller: accesses a first signal representing a first concentration of a first gas in ambient air proximal the mobile refueling platform; and, in response to the first concentration of the first gas exceeding a first concentration threshold (e.g., ten parts per million) permitted for refueling operation, transmits a first control signal to close the fuel valve of the mobile refueling platform. More specifically, the controller: identifies the first concentration falling within a first range of concentrations falling below the first concentration threshold permitted for refueling operation and exceeding a second concentration threshold (e.g., twenty parts per million); detects a first fault exhibiting a first duration (e.g., one minute, five minutes) corresponding to the first range of concentrations; and transmits the first control signal to close the fuel valve for the first duration—corresponding to the first range of concentrations—in response to detecting the first fault.

In this example, during a second time period succeeding the first time period (e.g., a difference between the second time period and the first time period exceeding the first duration, after expiration of the first duration), the controller: accesses a second signal representing a second concentration of the first gas in ambient air proximal the mobile refueling platform; and transmits a second control signal to open the fuel valve of the mobile refueling platform in response to the second concentration of the first gas falling below the first threshold permitted for refueling operation and in response to expiration of the first duration corresponding to the first range.

Accordingly, the system can: prevent release of fuel from the mobile refueling platform for the first duration in response to detecting the first fault during a first pre-fueling validation procedure; execute a second pre-fueling validation procedure after expiration of the first fault (i.e., after expiration of the first duration); and open the fuel valve in response to a second set of conditions of the mobile refueling platform—detected during the second pre-fueling validation procedure—corresponding to the set of target conditions. Therefore, the system can implement a "lockout" duration responsive to a fault to prevent refueling operation and to enable an operator to investigate and/or remediate a cause of the fault.

In another example, the controller: accesses a third signal representing a third concentration (e.g., 100 parts per million) of the first gas in ambient air proximal the mobile refueling platform; identifies the third concentration falling within a second range of concentrations exceeding the first concentration threshold (e.g., ten parts per million) permitted for refueling operation and exceeding the second concentration threshold (e.g., twenty parts per million); detects a second fault exhibiting a second duration (e.g., five minutes, ten minutes) corresponding to the second range of concentrations, the second duration exceeding the first duration; and transmits the third control signal to close the fuel valve for the second duration—corresponding to the second range of concentrations—in response to detecting the second fault.

Accordingly, the system can: detect the second fault exhibiting the second duration exceeding the first duration and based on the second range of concentrations exceeding the first range of concentrations; and transmit the third control signal to close the fuel valve for the second duration. Therefore, the system can prevent fuel is prevented from being released from the mobile refueling platform for a longer duration of a time responsive to a fault exhibiting higher severity.

6.2 Operator Notification & Override

Blocks of the method S100 recite, in response to detecting the fault: generating a prompt indicating the fault and confirming release of fuel from the mobile refueling platform in Block S152; and serving the prompt to an operator at an operator interface in Block S154.

Block S130 of the method S100 recites, in response to receiving confirmation to release fuel from the mobile refueling platform, transmitting a third control signal to open the fuel valve of the mobile refueling platform.

Generally, the controller can periodically (e.g., every minute, every five minutes, every hour) generate messages (e.g., notifications) indicating status information of the mobile refueling platform and/or the signals received from the set of sensors. The controller can transmit these messages to a remote monitoring system and/or to an operator via an operator interface (e.g., a control panel included in the mobile refueling platform, a mobile device executing an application representing the operator interface).

In one implementation, the controller can: detect a fault based on a difference between the set of conditions of the mobile refueling platform and the set of target conditions permitted for refueling operation; and generate a prompt indicating the fault and requesting confirmation to release of fuel from the mobile refueling platform in Block S152. For example, the controller can generate the prompt indicating: the set of conditions (or a subset of conditions) of the mobile refueling platform; the set of target conditions (or a subset of target conditions) permitted for refueling operation; and/or the difference between the set of conditions and the set of target conditions. The controller can serve the prompt to an operator at an operator interface in Block S154.

In another implementation, the controller can: receive confirmation—from the operator interface—to release fuel from the mobile refueling platform; and transmit a control signal to open the fuel valve of the mobile refueling platform in Block S130.

Accordingly, the system can: notify an operator of a fault; and selectively control the fuel valve based on confirmation from the operator to release (or dispense) fuel from the mobile refueling platform. Therefore, the system enables an operator: to investigate a fault and remediate a source of the fault; and to manually override the fault and initiate fueling operation after investigation and/or remediation.

6.3 Fault Counts

Blocks of the method S100 recite: detecting a first fault in response to the second concentration exceeding the first concentration threshold in Block S140; accessing a fault counter associated with the first geospatial region in Block S180; in response to detecting the first fault, incrementing a value of the fault counter to an incremented value in Block S182; and, in response to the incremented value exceeding a fault count threshold, flagging the first geospatial region as a flagged geospatial region restricted from refueling operation in Block S184.

Figure 6:
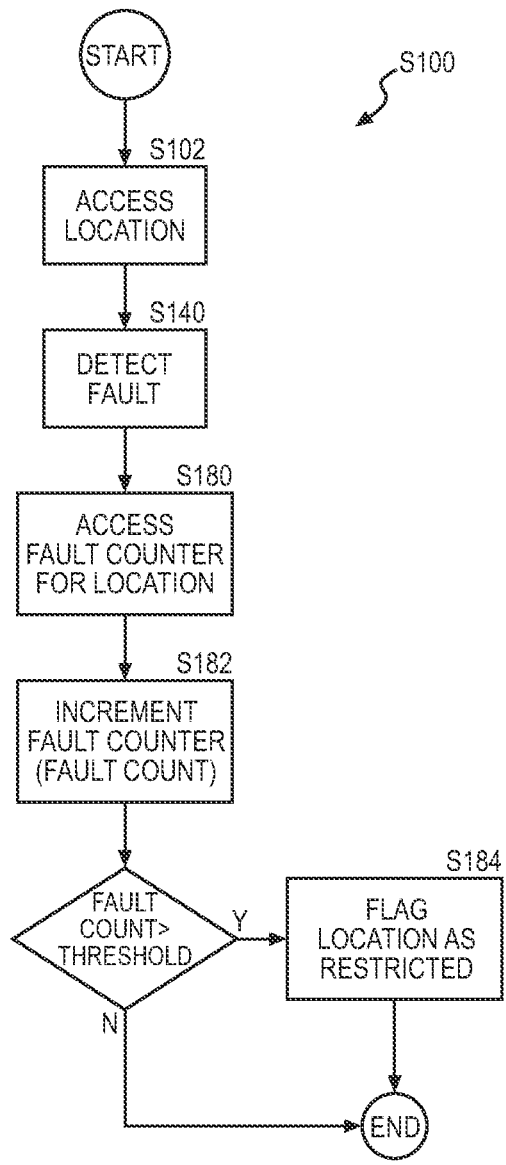
FIG. 6 is a flowchart representation of one variation of the method.

Generally, as shown in FIG. 6, the controller can store a set of fault counters associated with a set of geospatial regions, each fault counter—in the set of fault counters—storing a value (or "fault count") representing a quantity of faults detected by the mobile refueling platform (and/or other mobile refueling platforms) within a geospatial region in the set of geospatial regions. In response to detecting a fault within a particular geospatial region, the controller can: access a fault counter corresponding to the particular geospatial region; update (e.g., increment) a value of the fault counter; and transmit a notification to a remote monitoring system to update a global fault counter corresponding to the particular geospatial region. Additionally or alternatively, the controller can periodically (e.g., daily, weekly): receive, from the remote monitoring system, a first set of fault counts stored by a set of global fault counters; and update a second set of fault counts stored by the set of fault counters based on the first set of fault counts. In response to a particular fault counter, in the set of fault counters, exhibiting a value exceeding a fault count threshold, the controller can flag a geospatial region—corresponding to the particular fault counter—as a flagged geospatial region restricted from refueling operation.

In one implementation, in Block S140, the controller can detect a fault based on a difference between a condition of the mobile refueling platform and a target condition permitted for refueling operation. For example, the controller can detect a first fault in response to a signal representing a concentration of a gas in ambient air proximal the mobile refueling platform exceeding a concentration threshold.

In another implementation, in Block S180, the controller can access a first fault counter associated with the first geospatial region, the first fault counter storing a value representing a first quantity of faults detected by the mobile refueling platform (and/or other mobile refueling platforms) within the first geospatial region. More specifically, the controller can access the first fault counter associated with the first geospatial region in response to: accessing the first signal representing the first geospatial position within the first geospatial region in Block S102; and detecting the fault in Block S140.

In one implementation, in response to detecting the first fault, the controller can increment the value of the first fault counter to an incremented value in Block S182. For example, in response to detecting the first fault, the controller can increment the first fault counter from a first value (e.g., one) to a second value (e.g., two).

In another implementation, in response to the incremented value (e.g., the second value) exceeding a fault count threshold (e.g., ten faults), the controller can flag the first geospatial region as a flagged geospatial region restricted from refueling operation in Block S184. Additionally, the controller can transmit a notification to the remote monitoring system indicating the incremented value exceeding the fault count threshold and/or the first geospatial region as the flagged geospatial region restricted from refueling operation.

Accordingly, by tracking a fault count for each geospatial region in the set of geospatial regions, the controller can: detect a particular location exhibiting a high fault count (e.g., exceeding a fault count threshold); flag the particular location as a high-risk location based on the high fault count; and restrict the particular location from future mobile refueling operation, thereby reducing risk of future safety and/or environment incidents in the particular location.

7. Intra-Fueling Validation

Block S150 of the method S100 recites dispensing fuel from the mobile refueling platform.

Block S140 of the method S100 recites detecting a fault based on a second difference between the first set of conditions and a first set of target conditions including: a first target condition representing a target range of concentrations of the first gas permitted for fueling operation; a second target condition representing a target range of flow rate differential values permitted for refueling operation; and a third target condition representing a target range of wind speeds permitted for refueling operation.

Block S142 of the method S100 recites, in response to detecting the fault, transmitting a first control signal to close a fuel valve of the mobile refueling platform.

Generally, the system can initiate refueling operation in response to completing the first validation procedure (i.e., the pre-fueling validation procedure) and opening the fuel valve. The system can then dispense fuel from the mobile refueling platform to the vehicle. During the time period in which fuel is dispensed from the mobile refueling platform (or "refueling period"), the system can perform an additional validation procedure (or "intra-fueling validation procedure") to: detect conditions of the mobile refueling platform; verify correspondence between the conditions of the mobile refueling platform and target conditions permitted for refueling operation; and selectively control the fuel valve based on a result of the validation procedure.

In one implementation, in Block S150, the system can dispense fuel from the mobile refueling platform during the refueling time period.

In another implementation, during the refueling period, the controller can implement methods and techniques described above to: access a set of target conditions (e.g., a second set of target conditions for intra-fueling validation) permitted for refueling operation; detect a set of conditions (e.g., location condition, distance condition(s), wind condition, gas concentration condition, temperature condition, light condition, fire condition) of the mobile refueling platform; and compare the set of conditions to the set of target conditions.

For example, the second set of target conditions can include: a first target condition representing a target range of concentrations of the first gas permitted for fueling operation; a second target condition representing a target range of flow rate differential values permitted for refueling operation; and a third target condition representing a target range of wind speeds permitted for refueling operation.

In this implementation, in response to the set of conditions corresponding to the set of target conditions, the controller can transmit a control signal to open a fuel valve of the mobile refueling platform. More specifically, the controller can transmit the control signal to maintain the fuel valve in an open position in response to the set of conditions corresponding to the set of target conditions.

Alternatively, during the refueling period, the controller can: detect a fault based on a difference between the set of conditions and the set of target conditions in Block S140; and, in response to detecting the fault, transmit a control signal to close the fuel valve of the mobile refueling platform in Block S142. For example, the controller can detect the fault based on: a concentration of a gas in ambient air proximal the mobile refueling platform exceeding a concentration threshold; a flow rate differential value—based on a difference between a second flow rate at the nozzle and a first flow rate at the fueling manifold—exceeding a flow rate differential threshold; and/or a wind speed proximal the mobile refueling platform exceeding a wind speed threshold.

In one implementation, the controller can periodically (e.g., every 30 seconds, every minute) repeat the foregoing process to execute a set of intra-fueling validation procedures during the refueling period.

Accordingly, the system can: periodically monitor the mobile refueling platform and refueling operation during the refueling period; and trigger the fuel valve to close in response to detecting a fault. Therefore, the system can minimize risk and/or impact of a fuel spill or fire occurring during the refueling period.

7.1 Fuel Leak Detection

Blocks of the method S100 recite: accessing a fourth signal representing a first flow rate of fuel at a fueling manifold of the mobile refueling platform in Block S118; accessing a fifth signal representing a second flow rate of fuel at a nozzle fluidly coupled to the fueling manifold in Block S120; calculating a first flow rate differential value based on a first difference between the second flow rate and the first flow rate in Block S122; and, in response to the first flow rate differential value exceeding a flow rate differential threshold, transmitting a second control signal to close the fuel valve of the mobile refueling platform in Block S142.

In one implementation, the controller can access a fifth target condition representing a range of flow rate differential values permitted for refueling operation. More specifically, the controller can access the fifth target condition representing the range of flow rate differential values defining a flow rate differential threshold (e.g., 0.1 gallons per minute, 0.5 gallons per minute) characterizing an upper boundary (or "maximum flow rate differential value") of the range of flow rate differential values permitted for refueling operation.

In another implementation, the controller can: access a first signal representing a first flow rate (e.g., at a first time) at the fueling manifold in Block S118; access a second signal representing a second flow rate (e.g., at the first time, at a second time approximating the first time) at the nozzle in Block S120; and calculate a flow rate differential value based on a difference between the first flow rate and the second flow rate in Block S122. The controller can detect the flow rate differential value as a fifth condition (e.g., flow rate differential condition) of the mobile refueling platform.

In one implementation, the controller can detect correspondence between the fifth condition of the mobile refueling platform and the fifth target condition. For example, the controller can detect correspondence between the fifth condition and the fifth target condition based on the flow rate differential value falling below the flow rate differential threshold. The controller can record a nominal status value associated with the fifth condition in response to the fifth condition corresponding to the fifth target condition.

Alternatively, the controller can detect a difference between the fifth condition and the fifth target condition based on the flow rate differential value exceeding the flow rate differential threshold. The controller can: detect a fault based on the difference between the fifth condition and the fifth target condition in Block S140; and record a fault status value associated with the second condition. Additionally, in Block S142, the controller can transmit a signal to close the fuel valve in response to detecting the fault.

For example, the controller can: access a flow rate differential threshold of 0.1 gallons per minute; access a first signal representing a first flow rate of eight gallons per minute at the fueling manifold; access a second signal representing a second flow rate of seven gallons per minute at the nozzle; calculate a flow rate differential value of one gallon per minute based on a difference between the first flow rate and the second flow rate; and detect a fault in response to the flow rate differential value exceeding the flow rate differential threshold. In response to detecting the fault, the controller can: transmit a signal to close the fuel valve; generate a notification indicating a fault status of the mobile refueling platform; and serve the notification to an operator via an operator interface.

Accordingly, by detecting the flow rate differential value exceeding the flow rate differential threshold, the system can: identify a potential fuel leak during refueling operation: and close the fuel value of the mobile refueling platform, thereby minimizing further spillage of fuel during refueling operation.

In another implementation, the controller can access a sixth target condition representing a range of flow rate values permitted for refueling operation. More specifically, the controller can access the sixth target condition representing the range of flow rate values defining: a first flow rate threshold (e.g., two gallons per minute, five gallons per minute) characterizing a lower boundary (or "minimum flow rate") of the range of flow rate values permitted for refueling operation; and a second flow rate threshold (e.g., ten gallons per minute, fifteen gallons per minute) characterizing an upper boundary (or "maximum flow rate") of the range of flow rate values permitted for refueling operation.

In this implementation, the controller can: detect the first flow rate as a sixth condition (e.g., flow rate condition) of the mobile refueling platform; and detect the second flow rate as a seventh condition (e.g. flow rate condition) of the mobile refueling platform.

The controller can detect correspondence between the sixth condition and the sixth target condition based on the first flow rate: exceeding the first flow rate threshold; and falling below the second flow rate threshold. The controller can detect correspondence between the seventh condition and the sixth target condition based on the second flow rate: exceeding the first flow rate threshold; and falling below the second flow rate threshold.

Alternatively, the controller can detect a fault based on: a difference between the sixth condition and the sixth target condition; and/or a difference between the seventh condition and the sixth target condition. More specifically, the controller can detect a fault in response to: the first flow rate falling below the first flow rate threshold; the second flow rate falling below the first flow rate threshold; the first flow rate exceeding the second flow rate threshold; and/or the second flow rate exceeding the second flow rate threshold. In response to detecting the fault, the controller can transmit a control signal to close the fuel valve.

7.6 Fuel Limit Detection

Blocks of the method S100 recite: accessing a fourth signal representing a first volume of fuel dispensed from the mobile refueling platform in Block S124; and, in response to the first volume of fuel exceeding a volume threshold, transmitting a second control signal to close the fuel valve of the mobile refueling platform in Block S142.

Generally, the system can limit a volume of fuel dispensed from the mobile refueling platform to a particular vehicle during refueling operation. For example, the system can limit the volume of fuel dispensed from the mobile refueling platform based on a volume threshold (e.g., fifteen gallons, 25 gallons) representing a maximum volume of fuel permitted to be dispensed in a single instance of refueling operation.

In one implementation, the controller can: access a signal representing a volume of fuel dispensed from the mobile refueling platform in Block S124; and, in response to the volume of fuel dispensed from the mobile refueling platform exceeding the volume threshold, transmit a control signal to close the fuel valve of the mobile refueling platform in Block S142. Additionally, in Block S140, the controller can detect a fault in response to the volume of fuel dispensed from the mobile refueling platform exceeding the volume threshold.

8. Fueling Record

Block S110 of the method S100 recites, in response to the first set of conditions corresponding to the first set of target conditions, generating a first record specifying: the first geospatial position of the mobile refueling platform; the first distance between the mobile refueling platform and the first surface; and the first concentration of the first gas.

Block S172 of the method S100 recites storing the first record in a data repository on the mobile refueling platform. Block S174 of the method S100 recites transmitting the first record to a remote data repository.

Generally, in Block S170, S172, and S174, the controller can generate a record characterizing a result of a validation procedure and/or an instance of refueling operation. The controller can store the record in a data repository (or "record database").

In one implementation, in Block S170, the controller can generate the record specifying: signals received from the set of sensors; timestamps of the signals received from the set of sensors; the set of conditions (e.g., location condition, distance condition(s), wind condition, gas concentration condition, flow rate differential condition, flow rate condition(s)) of the mobile refueling platform; the set of target conditions permitted for refueling operation; information representing statuses of the set of sensors; control signals transmitted by the controller in association with the instance of refueling operation; timestamps of the control signals transmitted by the controller; a volume of fuel dispensed from the instance of refueling operation; a timestamp of the instance of refueling operation; a unique identifier of the mobile refueling platform; a unique identifier of a vehicle (e.g., vehicle identification number, license plate number) to be refueled in the instance of refueling operation; a set of faults (e.g., zero faults, one fault, two faults) detected in association with the instance of refueling operation; a description of an incident detected by the system during the refueling operation, such as a fuel spill, release of fire suppressant, fire, or explosion; and/or other information associated with the instance of refueling operation; etc.

In one example, the controller generates a first record in response to the set of conditions of the mobile refueling platform corresponding to the set of target conditions. In this example, the controller generates the first record specifying: a first geospatial position of the mobile refueling platform; a first distance between the mobile refueling platform and a first surface of a first object proximal the mobile refueling platform; and a first concentration of a first gas in ambient air proximal the mobile refueling platform.

In another example, the controller generates a second record in response to detecting a fault based on a difference between the set of conditions of the mobile refueling platform and the set of target conditions. In this example, the controller generates the second record indicating the fault and specifying: a volume of fuel dispensed from the mobile refueling platform; the first concentration of the first gas detected during a first validation procedure (e.g., pre-fueling validation procedure); a second concentration of the first gas detected during a second validation procedure (e.g., intra-fueling validation procedure); a first flow rate at the fueling manifold of the mobile refueling platform; a second flow rate at the nozzle of the mobile refueling platform; a first flow rate differential based on a difference between the second flow rate and the first flow rate; and a first wind speed proximal the mobile refueling platform.

In yet another example, the controller generates a third record in response to completion of the instance of refueling operation.

In one implementation, in Block S172, the controller can store the record in a data repository (e.g., vehicle data recorder) on the mobile refueling platform.

Additionally or alternatively, in Block 8174, the controller can transmit the record to a remote data repository and/or remote monitoring system, such as via a wireless communication network.

8.1 Risk

In one implementation, the controller can access the record database to retrieve a set of records of refueling operation and extract, from the set of records: a set of locations (e.g., geospatial regions) in which refueling operation was attempted or completed; a set of incidents recorded at each location in the set of locations; a set of operation statuses corresponding to each location in the set of locations; and, for each fault operation status value, extract the set of fault status values and/or sensor data corresponding to particular sense domains. The controller can then implement a refueling risk model to: assign a risk value to each location in the set of locations based on the set of fault status values, sensor data, and/or incidents recorded; append a location to a list of restricted locations based on the risk value assigned to the location exceeding a threshold risk value; and append a location to a list of permitted locations based on the risk value assigned to the location falling below a threshold risk value. The controller can repeat the foregoing process for each record in the record database. In one variation, the controller can prompt a human operator to manually verify the risk value assigned to a location.

9. CONCLUSION

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A method for hazard detection and fire prevention during mobile refueling operation, the method comprising:
during a first time period:
accessing a first signal representing a first geospatial position of a mobile refueling platform;
detecting the first geospatial position within a first geospatial region as a first condition in a first set of conditions of the mobile refueling platform, the first geospatial region permitted for refueling operation;
accessing a second signal representing a first distance between the mobile refueling platform and a first surface of a first object proximal the mobile refueling platform;
detecting the first distance exceeding a first distance threshold as a second condition in the first set of conditions;
accessing a third signal representing a first concentration of a first gas proximal the mobile refueling platform;
detecting the first concentration falling below a first concentration threshold as a third condition in the first set of conditions; and
in response to the first set of conditions corresponding to a first set of target conditions for refueling operation, transmitting a first control signal to open a fuel valve of the mobile refueling platform.

2. The method of claim 1:
wherein accessing the second signal comprises:
accessing a first frame captured by an optical sensor arranged on the mobile refueling platform, the first frame comprising a first set of distance values relative to a field of view of the optical sensor;
isolating a first cluster of distance values, in the first set distance values, representing the first surface in the first frame; and
deriving the first distance between the mobile refueling platform and the first surface based on the first cluster of distance values.

3. The method of claim 1:
further comprising:
accessing a first frame captured by an optical sensor arranged on the mobile refueling platform, the first frame comprising a first set of distance values relative to a field of view of the optical sensor;
extracting a first set of features of the first object based on the first set of distance values; and
assigning a first object type to the first object based on the first set of features; and
wherein detecting the first distance comprises detecting the first distance exceeding the first distance threshold corresponding to the first object type.

4. The method of claim 1:
wherein accessing the second signal comprises accessing the second signal representing a first vertical distance between the mobile refueling platform and the first surface of the first object positioned above the mobile refueling platform; and
wherein detecting the first distance comprises detecting the first vertical distance exceeding the first distance threshold corresponding to a minimum vertical distance.

5. The method of claim 1, further comprising:
during a second time period preceding the first time period:
accessing a fourth signal representing a second concentration of the first gas proximal the mobile refueling platform; and
in response to the second concentration exceeding the first concentration threshold, transmitting a second control signal to close the fuel valve of the mobile refueling platform.

6. The method of claim 5:
further comprising, in response to the second concentration falling within a second range exceeding the first concentration threshold and falling below a second concentration threshold, detecting a first fault exhibiting a first duration corresponding to the second range;
wherein transmitting the second control signal comprises transmitting the second control signal to close the fuel valve of the mobile refueling platform for the first duration; and
wherein transmitting the first control signal comprises transmitting the first control signal to open a fuel valve of the mobile refueling platform in response to:
the first set of conditions corresponding to the first set of target conditions; and
expiration of the first fault, a difference between the second time period and the first time period exceeding the first duration.

7. The method of claim 5, further comprising:
detecting a first fault in response to the second concentration exceeding the first concentration threshold;
accessing a fault counter associated with the first geospatial region;
in response to detecting the first fault, incrementing a value of the fault counter to an incremented value; and
in response to the incremented value exceeding a fault count threshold, flagging the first geospatial region as a flagged geospatial region restricted from refueling operation.

8. The method of claim 1, further comprising:
during a second time period succeeding the first time period:
dispensing fuel from the mobile refueling platform;
accessing a fourth signal characterizing a second concentration of the first gas proximal the mobile refueling platform;
detecting the second concentration falling below a second concentration threshold as a fourth condition in the second set of conditions; and
in response to the second set of conditions corresponding to a second set of target conditions for refueling operation, transmitting a second control signal to open the fuel valve of the mobile refueling platform.

9. The method of claim 1, further comprising:
during a second time period succeeding the first time period:
dispensing fuel from the mobile refueling platform;
accessing a fourth signal characterizing a second concentration of the first gas proximal the mobile refueling platform; and
in response to detecting the second concentration exceeding a second concentration threshold:
transmitting a second control signal to close the fuel valve of the mobile refueling platform; and
generating a first record specifying:
a total volume of fuel dispensed from the mobile fueling platform;
the first concentration of the first gas; and
the second concentration of the first gas.

10. The method of claim 1, further comprising:
during a second time period succeeding the first time period:
dispensing fuel from the mobile refueling platform;
accessing a fourth signal representing a first volume of fuel dispensed from the mobile refueling platform; and
in response to the first volume of fuel exceeding a volume threshold, transmitting a second control signal to close the fuel valve of the mobile refueling platform.

11. The method of claim 1:
during a second time period succeeding the first time period:
dispensing fuel from the mobile refueling platform;
accessing a fourth signal representing a first flow rate of fuel at a fueling manifold of the mobile refueling platform;
accessing a fifth signal representing a second flow rate of fuel at a nozzle fluidly coupled to the fueling manifold;
calculating a first flow rate differential value based on a difference between the second flow rate and the first flow rate; and
in response to the first flow rate differential value exceeding a flow rate differential threshold, transmitting a second control signal to close the fuel valve of the mobile refueling platform.

12. The method of claim 11, further comprising, in response to the difference between the second flow rate and the first flow rate exceeding the flow rate threshold:
generating a notification indicating a fault status of the mobile refueling platform; and
serving the notification to an operator via an operator interface.

13. The method of claim 1:
further comprising, during the first time period:
accessing a fourth signal representing a first wind speed proximal the mobile refueling platform; and
detecting the first wind speed within a first wind speed range falling below a first wind speed threshold as a fourth condition in the first set of conditions; and
wherein detecting the first concentration comprises detecting the first concentration falling below the first concentration threshold corresponding to the first wind speed range.

14. The method of claim 13:
further comprising, during a second time period succeeding the first time period:
dispensing fuel from the mobile refueling platform;
accessing a fifth signal representing a second wind speed proximal the mobile refueling platform; and
detecting the second wind speed within a second wind speed range exceeding the first wind speed range;
accessing a sixth signal representing a second concentration of the first gas proximal the mobile refueling platform; and
in response to detecting the second concentration exceeding a second concentration threshold corresponding to the second wind speed range, transmitting a second control signal to close the fuel valve of the mobile refueling platform.

15. The method of claim 1, further comprising:
accessing a fourth signal representing a first temperature proximal the mobile refueling platform; and
in response to detecting the first temperature exceeding a first temperature threshold:
transmitting a second control signal to close the fuel valve of the mobile refueling platform; and
transmitting a third control signal to release fire suppressant.

16. A method for hazard detection and fire prevention during mobile refueling operation, the method comprising:
during a first time period:
dispensing fuel from a mobile refueling platform;
accessing a first signal representing a first concentration of a first gas proximal the mobile refueling platform as a first condition in a first set of conditions of the mobile refueling platform;
accessing a second signal representing a first flow rate of fuel at a fueling manifold of the mobile refueling platform;
accessing a third signal representing a second flow rate of fuel at a nozzle fluidly coupled to the fueling manifold;
calculating a first flow rate differential value based on a first difference between the second flow rate and the first flow rate as a second condition in the first set of conditions;
accessing a fourth signal representing a first wind speed proximal the mobile refueling platform as a third condition in the first set of conditions;
detecting a fault based on a second difference between the first set of conditions and a first set of target conditions for refueling operation, the first set of target conditions comprising:
a first target condition representing a target range of concentrations of the first gas permitted for fueling operation;
a second target condition representing a target range of flow rate differential values permitted for refueling operation; and
a third target condition representing a target range of wind speeds permitted for refueling operation; and
in response to detecting the fault, transmitting a first control signal to close a fuel valve of the mobile refueling platform.

17. The method of claim 16, further comprising, during a second time period preceding the first time period:
accessing a fifth signal representing a first geospatial position of the mobile refueling platform;
accessing a sixth signal representing a first distance between the mobile refueling platform and a first surface of a first object proximal the mobile refueling platform;
accessing a seventh signal representing a second concentration of the first gas proximal the mobile refueling platform; and
transmitting a second control signal to open a fuel valve of the mobile refueling platform in response to:
detecting the first geospatial position within a first geospatial region permitted for refueling operation;
detecting the first distance exceeding a first distance threshold; and
detecting the second concentration falling below a second concentration threshold.

18. The method of claim 16, further comprising:
in response to detecting the fault:
generating a prompt indicating the fault and confirming release of fuel from the mobile refueling platform;
serving the prompt to an operator at an operator interface; and
in response to receiving confirmation to release fuel from the mobile refueling platform, transmitting a third control signal to open the fuel valve of the mobile refueling platform.

19. The method of claim 16, further comprising:
generating a first record indicating the fault, the first record specifying:
a volume of fuel dispensed from the mobile refueling platform;
the first concentration of the first gas;
the first flow rate;
the second flow rate;
the first difference between the second flow rate and the first flow rate; and
the first wind speed; and
transmitting the first record to a remote data repository.

20. A method for hazard detection and fire prevention during mobile refueling operation, the method comprising:
accessing a first signal representing a first geospatial position of a mobile refueling platform as a first condition in a set of conditions of the mobile refueling platform;
accessing a second signal representing a first distance between the mobile refueling platform and a first surface of a structure proximal the mobile refueling platform as a second condition in the set of conditions;
accessing a third signal representing a first concentration of a first gas proximal the mobile refueling platform as a third condition in the set of conditions;
detecting a fault based on a difference between the set of conditions and a set of target conditions for refueling operation, the set of target conditions comprising:
a first target condition representing a target range of geospatial positions permitted for refueling operation;
a second target condition representing a target range of distances between the mobile refueling platform and a target surface of a target object proximal the mobile refueling platform permitted for refueling operation; and
a third target condition representing a target range of concentrations of the first gas permitted for fueling operation; and in response to detecting the fault, transmitting a control signal to close a fuel valve of the mobile refueling platform.

\* \* \* \* \*